(12) United States Patent
Dahlén et al.

(10) Patent No.: US 9,049,624 B2
(45) Date of Patent: Jun. 2, 2015

(54) METHOD FOR PERFORMING A HANDOVER IN A MOBILE COMMUNICATION SYSTEM

(75) Inventors: Anders Dahlén, Vasterhaninge (SE); Ulf Nilsson, Vasterhaninge (SE)

(73) Assignee: TELIASONERA AB, Stockholm (SE)

( * ) Notice: Subject to any disclaimer, the term of this patent is extended or adjusted under 35 U.S.C. 154(b) by 415 days.

(21) Appl. No.: 12/905,465

(22) Filed: Oct. 15, 2010

(65) Prior Publication Data

US 2011/0090872 A1 Apr. 21, 2011

(30) Foreign Application Priority Data

Oct. 16, 2009 (EP) .................................... 09173281

(51) Int. Cl.
| | |
|---|---|
| H04W 60/00 | (2009.01) |
| H04W 36/00 | (2009.01) |
| H04W 60/04 | (2009.01) |
| H04W 68/12 | (2009.01) |
| H04W 92/02 | (2009.01) |

(52) U.S. Cl.
CPC .......... H04W 36/0022 (2013.01); *H04W 60/04* (2013.01); *H04W 68/12* (2013.01); *H04W 92/02* (2013.01)

(58) Field of Classification Search
USPC ......................................................... 370/332
See application file for complete search history.

(56) References Cited

U.S. PATENT DOCUMENTS

| | | | | |
|---|---|---|---|---|
| 2006/0116125 | A1* | 6/2006 | Buckley et al. ............ | 455/435.1 |
| 2010/0303041 | A1* | 12/2010 | Diachina et al. ............ | 370/331 |
| 2010/0331011 | A1* | 12/2010 | Vikberg et al. ............ | 455/456.1 |

FOREIGN PATENT DOCUMENTS

| | | |
|---|---|---|
| WO | 2009/081268 A1 | 7/2009 |
| WO | 2009/095777 A1 | 8/2009 |

OTHER PUBLICATIONS

"Digital cellular telecommunications system (Phase 2+); Universal Mobile Telecommunications System (UMTS); LTE; Circuit Switched (CS) fallback in Evolved Packet System (EPS); Stage 2 (3GPP TS 23,.272 version 8.4.0 R1lease 8)", Technical Specification, European Telecommunications Standards Institute (ETSI), I Jun. 1, 2009, No. V8.4.0., F-06921 Sophia-Antipolis; France, ,XPOI 4044533.
European Search Report, dated Feb. 1, 2010, in EP 09 17 3281.
"3rd Generation Partnership Project; Technical Specification Group Services and System Aspects; General Packet Radio Service (GPRS) enhancements for Evolved Universal Terrestrial Radio Access Network (R-UTRAN) access (Release 9)", 3GPP TS 23.401 v9.2.0 (Sep. 2009), pp. 1-245.
Telecom Italia, "Improving user experience with CS fallback", 3GPP TSG SA WG2 Meeting #74, TD S2-094578, Jul. 6-10, 2009, work item SAES-CSFB/Rel-8, agenda item 6.6, pp. 1-2.
Extended European Search Report, dated Sep. 12, 2013, from corresponding EP application.

* cited by examiner

*Primary Examiner* — Sulaiman Nooristany
(74) *Attorney, Agent, or Firm* — Young & Thompson (57) ABSTRACT

A method where a first type location area of a mobile node is registered to a first mobility management node. A second type location area is determined based on a location of the mobile node. A second type location area of the mobile node is registered to a second mobility management node of a second system. A request to perform user plane bearer establishment through the second system is received. Thereupon, radio measurements associated with at least two candidate cells are obtained from the mobile node. Candidate cells are searched to find at least one cell associated with the second type location area. A cell is selected among the at least one cell, which is indicated to the selected cell to the mobile node. A handover request is provided to the mobile node.

18 Claims, 7 Drawing Sheets

METHOD FOR PERFORMING A HANDOVER IN A MOBILE COMMUNICATION SYSTEM

BACKGROUND OF THE INVENTION

1. Field of the Invention

The invention relates to mobile communications comprising, for example, data, voice and multimedia. Particularly, the invention relates to a method for performing a handover in mobile communication system.

2. Description of the Related Art

Fourth generation mobile communication systems are being developed as a further step of evolution since the introduction of 2G and 3G mobile communication systems. A notable example of a 2G mobile communication system is the Global System of Mobile Communication (GSM) standardized by European Telecommunication Standards Institute (ETSI), which provides a digital circuit switched data using a Time Division Multiple Access (TDMA) based radio interface. GSM achieves downlink data rates up to 64 kbps with circuit switched data and up to 144 kbps with packet switched data using the General Packet Radio Systems (GPRS) technology also standardized in ETSI. From the 3G side of the family of mobile communication systems most notable example is the Wideband Code Division Multiple Access (WCDMA) radio technology based Universal Mobile Communications System (UMTS). UMTS supports packet switched data rates up to 384 kbps and up to 4 Mbps with High-Speed Downlink Packet Access (HSDPA). The fourth generation mobile communication systems, also referred to as the Next Generation Mobile Networks (NGMN), aim to provide downlink data rates up to 100 Mbps and uplink data rates up to 50 Mbps. The downlink data rates basically enable the receiving of High Definition Television (HDTV) signals. A 4G mobile communication system is being standardized by the 3G Partnership Project (3GPP) under the title Long-Term Evolution (LTE). The LTE architecture, referred to also as the Evolved Packet System (EPS), comprises an Evolved Packet Core (EPC) and an Evolved UMTS Radio Access Network (E-UTRAN). LTE relies on the Orthogonal Frequency Division Multiplexing (OFDM) radio technology. EPC also supports a variety of radio access technologies in addition to OFDM based E-UTRAN. EPC supports alternative radio access technologies such as WLAN and WiMAX. It is also a necessary objective for the EPC to support legacy Radio Access Technology (RAT) based access networks such as GSM-EDGE Radio Access Networks (GERAN) and UMTS Radio Access Networks (UTRAN). It has been postulated that there will be a long transition period in the deployment of full coverage using E-UTRANs or alternative RAT based RANs. Therefore, the support of legacy RATs is essential. There is also going to be interworking between the EPC and legacy core networks such the Circuit Switched (CS) GSM core network and the CS domain of the UMTS core network.

Figure 1:
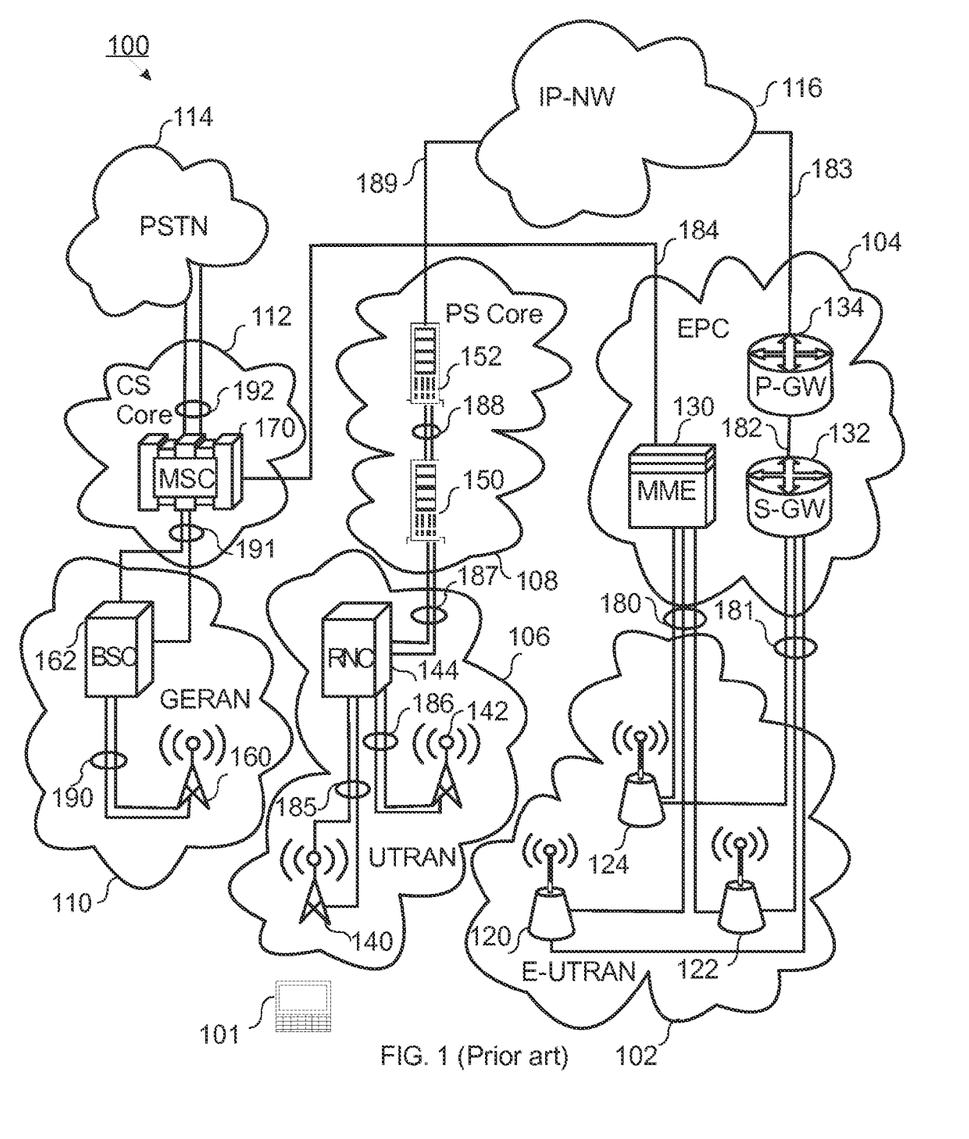
FIG. 1 is a block diagram illustrating a Evolved Packet System (EPS) in prior art.

Reference is now made to FIG. 1, which illustrates an Evolved Packet System (EPS) in prior art. In FIG. 1 there is illustrated an Evolved Packet System (EPS) 100. In Evolved Packet System 100 there is an Evolved UTRAN (E-UTRAN) 102. E-UTRAN 102 communicates with Evolved Packet Core (EPC) 104. Evolved Packet Core 104 communicates with IP Network 116. There is also a UTRAN 106, which communicates with Packet Switched Core 108. Packet Switched Core 108 communicates with an IP Network 116. There is also a GERAN 110 which communicates with Circuit Switched (CS) core 112. CS core 112 communicates with Public Switched Telephone Network (PSTN) 114, which may represent any circuit switched network.

There is also illustrated a UE 101, in other words, a mobile station. UE 101 may comprise a smart card such as, for example, a USIM or a SIM.

In E-UTRAN 102 there are illustrated three eNodeBs, namely an eNodeB 120, an eNodeB 122 and an eNodeB 124. ENodeBs 120-124 have a signaling plane connection to a Mobility Management Entity (MME) 130 as illustrated with lines encircled by oval 180. ENodeBs 120-124 have user plane connections to an S-GW 132, as illustrated with lines encircled by oval 181. In EPC 104, there is a Mobile Management Entity (MME) 130. S-GW 132 is connected to a Packet Data Network (PDN) Gateway (P-GW) 134, as illustrated with the line 182. EPC 104 is connected to IP Network 116 as illustrated with line 183.

In UTRAN 106 there are illustrated two nodeBs, namely a nodeB 140 and a nodeB 142, which communicate with a Radio Network Controller (RNC) 144. The lines representing user plane and signaling plane connections from nodeB 142 to RNC 144 are encircled with oval 185. The user plane and signaling plane connections from nodeB 140 to RNC 144 are encircled with oval 186.

In PS Core 108, there is an SGSN 150 and a GGSN 152. The user plane and signaling plane connections from RNC 144 to SGSN 50 are illustrated with oval 187. The user plane and signaling plane connections between SGSN 150 and GGSN 152 are illustrated with oval 188. The GGSN 152 has an Access Point (AP) to IP network 116.

In GERAN 110 there is a base station 160 and a base station controller 162. The signaling plane and user plane connections are encircled oval 190. In circuit switched core 112 there is an MSC 170. In practice MSC 170 may comprise an MSC server and a media gateway and a signaling gateway. The user plane and signaling plane connections from BSC 162 to MSC 170 are encircled with oval 191. The user plane and signaling plane connections from CS Core 112 to PSTN 114 are encircled with oval 192.

An eNodeB such as eNodeB 120 acts as a base station in an EPS. An eNodeB performs radio resource management comprising radio bearer control radio admission control, connection mobility control and dynamic allocation of resources to UEs. An eNodeB also performs IP header compression and encryption of user plane data traffic. An eNodeB selects an MME at UE attachment when no routing to an MME can be determined from the information provided by the UE. An eNodeB also performs mobility management signaling with an MME. It routes a user plane data towards a serving gateway. An MME performs mobility management related functions. It performs tracking area list management, selects an S-GW and a P-GW for a UE. It selects MME in association with handovers. A serving gateway acts as local mobility anchor point for inter eNodeB handover. It performs packet routing and forwarding towards eNodeBs. A serving gateway also performs E-UTRAN idle mode downlink packet buffering an initiation of network trigged service requests. It also performs transport level packet marking in the uplink and the downlink directions. It also performs accounting and charging. A P-GW performs UE IP address allocation. It performs per user based package filtering by the package inspection. It performs transport level package marking in the downlink. It generally acts as an interface towards an external IP-NW such as the internet or an intranet.

EPC provides only a packet switched domain wherein calls may only be established as multimedia sessions using, for example, an IP Multimedia Subsystem (IMS). A problem with the existing packet switched EPC architecture is that call establishment may take up to several seconds. Another related problem is that the EPC architecture regarding the interworking with CS networks is complicated, which may contribute to a further delay.

In order to support CS calls and CS data bearers without necessitating User Equipments (UE) to camp exclusively on GERAN or UTRAN provided cells, it would be beneficial to be able to perform fallbacks to GERANs or UTRAN to establish CS calls or CS data bearers. It may be estimated that call establishment is initially faster through a legacy CS core network. Furthermore, in the case of mobile terminated CS calls initiated via the Public Switched Telephone Network (PSTN) there is no need to perform interworking through a VoIP gateway system. Furthermore, it is necessary to be able to perform a fallback to a correct Mobile Switching Center (MSC) which serves the current location area of the UE and to avoid unnecessary call attempts via a wrong MSC.

SUMMARY OF THE INVENTION

The invention relates to a method, comprising: registering a first type location area of a mobile node to a first mobility management node; determining a second type location area based on a location of the mobile node; registering a second type location area of the mobile node to a second mobility management node of a second system; receiving a request to perform user plane bearer establishment through the second system; obtaining radio measurements associated with at least two candidate cells from the mobile node; checking the at least two candidate cells to find at least one cell associated with the second type location area; selecting a cell among the at least one cell; indicating the selected cell to the mobile node; and providing at least one of a handover request, a cell change order and a request for a redirection to the mobile node.

The invention relates also to a system, comprising: a mobile node configured to perform radio measurements, to send a registration for a first type location area of the mobile node to a base station node and to receive at least one of a handover request, a cell change order and a request for a redirection from the base station node; a first mobility management node configured to receive a registration of a first type location area; a second mobility management node configured to receive a registration of a second type location area; and a base station node configured to register a first type location area of a mobile node to a first mobility management node, to determine a second type location area based on a location of the mobile node, to register a second type location area of the mobile node to a second mobility management node of a second system, to receive a request to perform user plane bearer establishment through the second system, to obtaining radio measurements associated with at least two candidate cells from the mobile node, to check the at least two candidate cells for at least one cell associated with the second type location area, to selecting a cell among the at least one cell, to indicate the selected cell to the mobile node and to provide at least one of a handover request, a cell change order and a request for a redirection to the mobile node.

The invention relates also to an apparatus, comprising: a memory configured to store a design under test comprising at least one of a reference model and a register transfer level model; and at least one processor configured to register a first type location area of a mobile node to a first mobility management node, to determine a second type location area based on a location of the mobile node, to register a second type location area of the mobile node to a second mobility management node of a second system, to receive a request to perform user plane bearer establishment through the second system, to obtaining radio measurements associated with at least two candidate cells from the mobile node, to checking the at least two candidate cells to find at least one cell associated with the second type location area, to selecting a cell among the at least one cell, to indicate the selected cell to the mobile node and to provide at least one of a handover request, a cell change order and a request for a redirection to the mobile node.

The invention relates also to an apparatus, comprising: means for registering a first type location area of a mobile node to a first mobility management node; means for determining a second type location area based on a location of the mobile node; means for registering a second type location area of the mobile node to a second mobility management node of a second system; means for receiving a request to perform user plane bearer establishment through the second system; means for obtaining radio measurements associated with at least two candidate cells from the mobile node; means for checking the at least two candidate cells for at least one cell associated with the second type location area; means for selecting a cell among the at least one cell; means for indicating the selected cell to the mobile node; and means for providing at least one of a handover request, a cell change order and a request for a redirection to the mobile node.

The invention relates also to a computer program comprising code adapted to perform the following steps when executed on a data-processing system: registering a first type location area of a mobile node to a first mobility management node; determining a second type location area based on a location of the mobile node; registering a second type location area of the mobile node to a second mobility management node of a second system; receiving a request to perform user plane bearer establishment through the second system; obtaining radio measurements associated with at least two candidate cells from the mobile node; checking the at least two candidate cells for at least one cell associated with the second type location area; selecting a cell among the at least one cell; indicating the selected cell to the mobile node; and providing at least one of a handover request, a cell change order and a request for a redirection to the mobile node.

The invention relates also to a computer program product comprising: registering a first type location area of a mobile node to a first mobility management node; determining a second type location area based on a location of the mobile node; registering a second type location area of the mobile node to a second mobility management node of a second system; receiving a request to perform user plane bearer establishment through the second system; obtaining radio measurements associated with at least two candidate cells from the mobile node; checking the at least two candidate cells for at least one cell associated with the second type location area; selecting a cell among the at least one cell; indicating the selected cell to the mobile node; and providing at least one of a handover request, a cell change order and a request for a redirection to the mobile node.

The invention relates also to a method comprising: registering a first type location area of a mobile node to a first mobility management node; determining a second type location area based on a location of the mobile node; registering a second type location area of the mobile node to a second mobility management node of a second system; receiving a request to perform user plane bearer establishment through the second system; receiving an index to a locally defined configuration from the first mobility management node; obtaining prioritization information to prioritize at least one cell that belongs to the second type location area over other cells in the second system; and providing the prioritization information obtained to the mobile node.

The invention relates also to a method comprising: registering a first type location area of a mobile node to a first mobility management node; determining a second type location area based on a location of the mobile node; registering a second type location area of the mobile node to a second mobility management node of a second system; receiving a request to perform user plane bearer establishment through the second system; providing a handover restriction list indicating the second type location area as the only allowed location area of the second system for the mobile node; detecting an incoming communication for the mobile node in the second system; checking at least one transmission from at least one neighboring cell in the mobile node; checking the restriction list by the mobile node; and skipping a location update in response to finding at least one neighboring cell in the restriction list.

In one embodiment of the invention, the restriction list checking is performed in the mobile node when the mobile node is in idle mode, whereas the restriction list checking is performed in a base station node and/or in the core network when the mobile node is in an active state, for example, in a connected state.

In one embodiment of the invention, the base station node comprises a UMTS Long-Term Evolution (LTE) nodeB, in other words, an eNodeB. In one embodiment of the invention, the base station node is any radio base station or a controller unit associated with at least one base station.

In one embodiment of the invention, by a first type location area is meant a location area of a first type and by a second type location area is meant a location area of a second type.

In one embodiment of the invention, the first system may comprise an OFDM based packet system. In one embodiment of the invention, the first system may comprise a 4G network, for example, an LTE system. In one embodiment of the invention, the first system may comprise an Ultra Mobile Broadband system. In one embodiment of the invention, the first system may comprise a multiple-input and multiple-output based system. In one embodiment of the invention, the first system may comprise an Evolution Data Only (EVDO) network.

In one embodiment of the invention, the first system may be any cellular radio system.

In one embodiment of the invention, the sec- and system comprises at least one of AMPS, GSM, UMTS, GPRS and CDMA2000.

In one embodiment of the invention, the first mobility management entity comprises an LTE mobility management entity. In one embodiment of the invention, the second mobility management node comprises a visitor location register or a mobile switching centre or a mobile switching centre server. In one embodiment of the invention, the second mobility management node comprises a 1xRTT MSC or MSC server. CDMA-2000 1xRTT is a 3G wireless technology based on the CDMA platform. The 1x in 1xRTT refers to 1x the number of 1.25 MHz channels. The RTT in 1xRTT stands for Radio Transmission Technology.

In one embodiment of the invention, a radio resource control entity in the base station node is configured to receive a list of at least two second type location area identifiers associated with the second mobility management node and to search for at least one cell in the list in response to failing to find a cell among the at least two candidate cells.

In one embodiment of the invention, the mobile node is configured to establish a user plane connection via the selected cell to a network element associated with the second mobility management node. The network element may be a mobile switching center or a media gateway that communicates with a mobile switching center server.

In one embodiment of the invention, the user plane connection comprises a circuit switched call and the network element is at least one of a mobile switching centre and mobile switching centre server. The circuit switched call may be a speech call, a video call or an unrestricted digital circuit switched data connection.

In one embodiment of the invention, a radio resource control entity within the base station node is configured to obtain the location of the mobile node as a first type location area, to map the first type location area to the second type location area using a mapping table.

In one embodiment of the invention, a radio resource control entity within the base station node is configured to receiving an index to a locally defined configuration from the first mobility management node and to obtaining information to prioritize at least one cell that belongs to the second type location area over other cells in the second system. The prioritization information may be stored in a memory in association with the base station node.

In one embodiment of the invention, the radio resource control entity provides the prioritization information obtained to the mobile node.

In one embodiment of the invention, a radio resource control entity in the base station node is configured to obtain information to prioritize additionally at least one cell that belongs to a list of prioritized location areas over other cells in the second system.

In one embodiment of the invention, a radio resource control entity in the base station node is configured to obtain a handover restriction list indicating the second type location area as the only allowed location area of the second system for the mobile node.

In one embodiment of the invention, a core network node such as a gateway MSC or visitor MSC or a mobility management node is configured to detect an incoming communication for the mobile node in the second system. The mobile node is configured to checking at least one transmission from at least one neighboring cell, to check the restriction list and to skip, that is, not to perform a location update in response to the finding at least one neighboring cell in the restriction list. The restriction list checking is performed in the mobile node when the mobile node is in idle mode, whereas the restriction list checking is performed in a base station node and/or in the core network when the mobile node is in an active state, for example, in a connected state. The base station node may not send the mobile node during handover to a cell that does not belong to the second type location area.

In one embodiment of the invention, the second type location area comprises at least one of a global system of mobile communications location area, a general packet radio service routing area and universal mobile telecommunication system location area.

In one embodiment of the invention, the first type location area comprises an evolved packet system tracking area.

In one embodiment of the invention, said system comprises a mobile communication network. In one embodiment of the invention, the mobile node, in other words, a user equipment or user comprises a mobile station or generally a mobile terminal. In one embodiment of the invention a user of a mobile terminal is identified using a subscriber module, for example, User Services Identity Module (UMTS) or a Subscriber Identity Module (SIM). The combination of Mobile Equipment (ME) and a subscriber module may be referred to as a mobile subscriber.

In one embodiment of the invention, the communication system comprises at least one of a Global System of Mobile Communications (GSM) network, a Universal Mobile Telephone System (UMTS) network and a 4G system such as LTE Evolved Packet System (EPS). The mobile station may be, for example, a GSM mobile station or a UMTS mobile station or an EPS user equipment with a dual mode or multimode functionality to support different access types.

In one embodiment of the invention, the computer program is stored on a computer readable medium. The computer readable medium may be a removable memory card, a removable memory module, a magnetic disk, an optical disk, a holographic memory or a magnetic tape. A removable memory module may be, for example, a USB memory stick, a PCMCIA card or a smart memory card.

The embodiments of the invention described hereinbefore may be used in any combination with each other. Several of the embodiments may be combined together to form a further embodiment of the invention. A method, a system, an apparatus, a computer program or a computer program product to which the invention is related may comprise at least one of the embodiments of the invention described hereinbefore.

The benefits of the invention are related to improved speed in establishing connections to a mobile node, the avoiding of extra handovers and avoiding connection establishment to a wrong core network node.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 2:
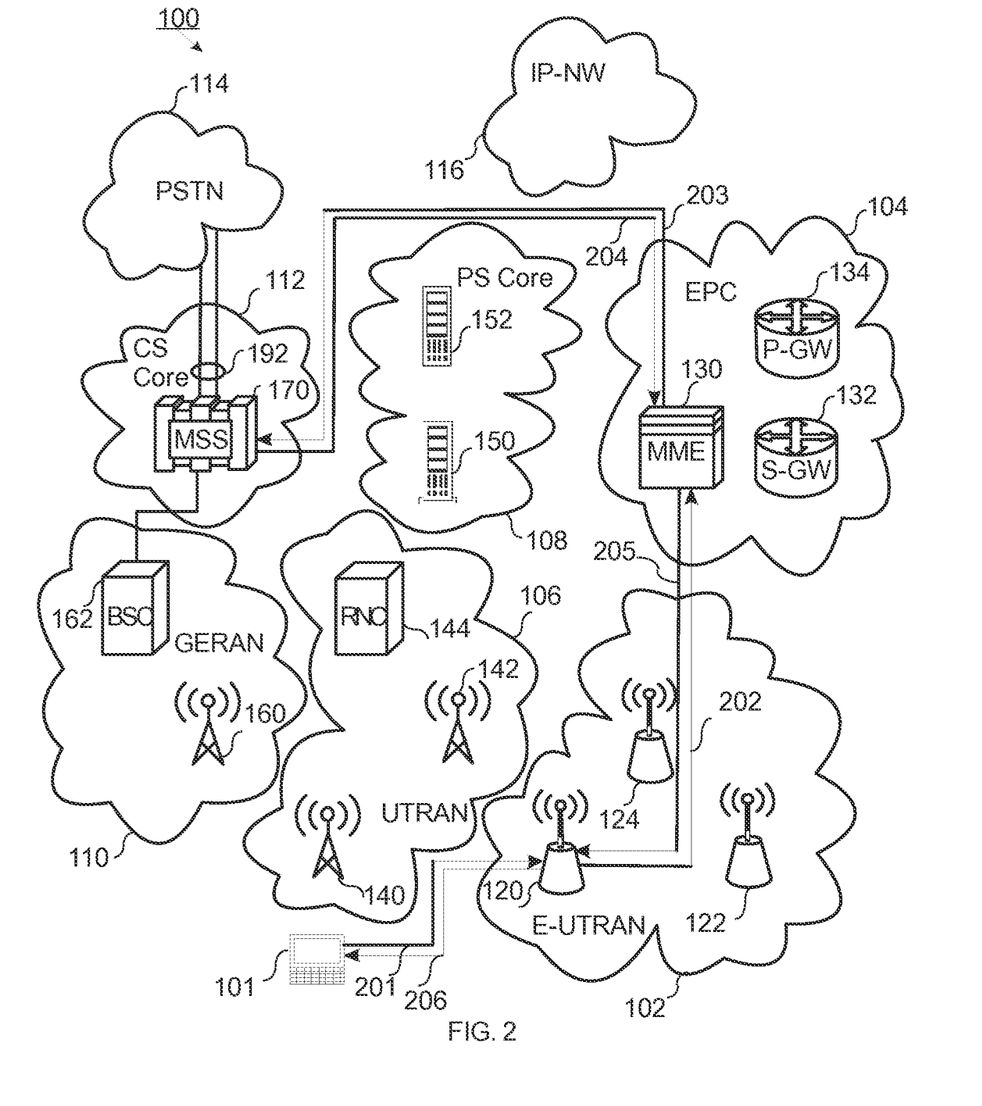
FIG. 2 is a block diagram illustrating a combined Tracking Area Update (TAU) and Location Area Update (LAU) in one embodiment of the invention.

FIG. 2 is a block diagram illustrating a combined Tracking Area Update (TAU) and Location Area Update (LAU) in one embodiment of the invention. In FIG. 2 there is illustrated a UE 101, which decides to perform a tracking area update. UE 101 detects that it must start camping on a cell that belongs to a new tracking area. UE 101 detects that the new tracking area TAI is not in the list of TAIs that the UE 101 has registered with the network. As illustrated with arrow 201, UE 101 sends a TAU request to eNodeB 120. The TAU request message comprises a Globally Unique Temporary Identifier (GUTI), last visited TAI, selected network, the Globally Unique MME Identifier (GUMMEI) for an old MME. As illustrated with arrow 202, eNodeB 120 sends a TAU request message to MME 130. MME 130 obtains the mobility management context regarding UE 101. From the mobility management context MME 130 determines if a visitor location register must also be updated. A new location area identifier is determined in MME 130 based on a mapping from the tracking area identifier that was obtained in the TAU request. The number for the visitor location register is derived from the tracking area identifier or the GUTI allocated to UE 101. As illustrated with arrow 203, MME 130 performs a location update procedure with MSC 170. A Location Update (LU) accept message is illustrated with arrow 204. In response to the location update accept message MME 130 sends a TAU accept message to eNodeB 120, as illustrated with arrow 205. ENodeB 120 sends the TAU accept message to UE 101, as illustrated with arrow 206. The TAU accept message comprises a GUTI, if MME 130 allocated a new GUTI. The TAU accept message also comprises a TAI list indicating a list of tracking area identifiers. UE 101 may be registered to a number of tracking areas and may be paged from all of them.

In TAU accept message illustrated with arrow 205, eNodeB receives an index to a locally defined configuration which affects handovers. MME 130 has earlier obtained the index from a Home Subscriber Server (HSS) (not shown) in a network attach procedure or from an earlier MME from which a TAU update has been performed to MME 130, which is the current MME. In one embodiment of the invention, the index is the index to RAT/Frequency Selection Priority (RFSP) index. The locally defined configuration may provide in eNodeBs an indication to prefer 2G or 3G cells associated with the location area registered by UE 101. The index may also be used to derive cell reselection priorities when UE 101 is in idle mode and to decide whether to redirect UE 101 in active mode to different frequency layers or radio access technologies.

In one embodiment of the invention, the locally defined configuration may comprise an indication to prefer 2G or 3G cells associated with the location area registered by UE 101 and other allowed or prioritized location areas. The list of other location areas may comprise location areas associated with MSC 170, that is, the MSC comprising the VLR to which the location update was performed with messages 203 and 204. The list may have been received from MSC 170.

In eNode there may be information on the association of cells with location areas, which may be stored in the locally defined configuration or elsewhere. The information on the association may have been obtained from MME 130 or from another network element such as MSC 170 or a network management node.

In one embodiment of the invention, eNodeB 120 may provide in message 206 a handover restriction list, which indicates the registered location area as the only allowed location area for UE 101 until a new TA update is performed which provides a new registered location area. By obtaining the handover restriction list UE 101 is prevented from making a location update before responding to a paging received from MSC 170.

In one embodiment of the invention, eNodeB 120 may indicate the registered location area and a list of other location areas as the allowed location areas to UE 101 in message 206. The list of other location areas may comprise location areas associated with MSC 170, that is, the MSC comprising the VLR to which the location update was performed with messages 203 and 204. The list may have been received from MSC 170.

In one embodiment of the invention, the locally defined information may also comprise at least one radio parameter threshold, which indicates how much worse the radio parameter value may be in a cell preferred because of belonging to the register location area in order to justify it being selected instead of the cell providing the best radio parameter value. There may also be defined an absolute minimum value for a radio parameter to allow it to be selected.

The embodiments of the invention described in association with FIG. 2 may be used in any combination with each other. Several of the embodiments may be combined together to form a further embodiment of the invention.

Figure 3:
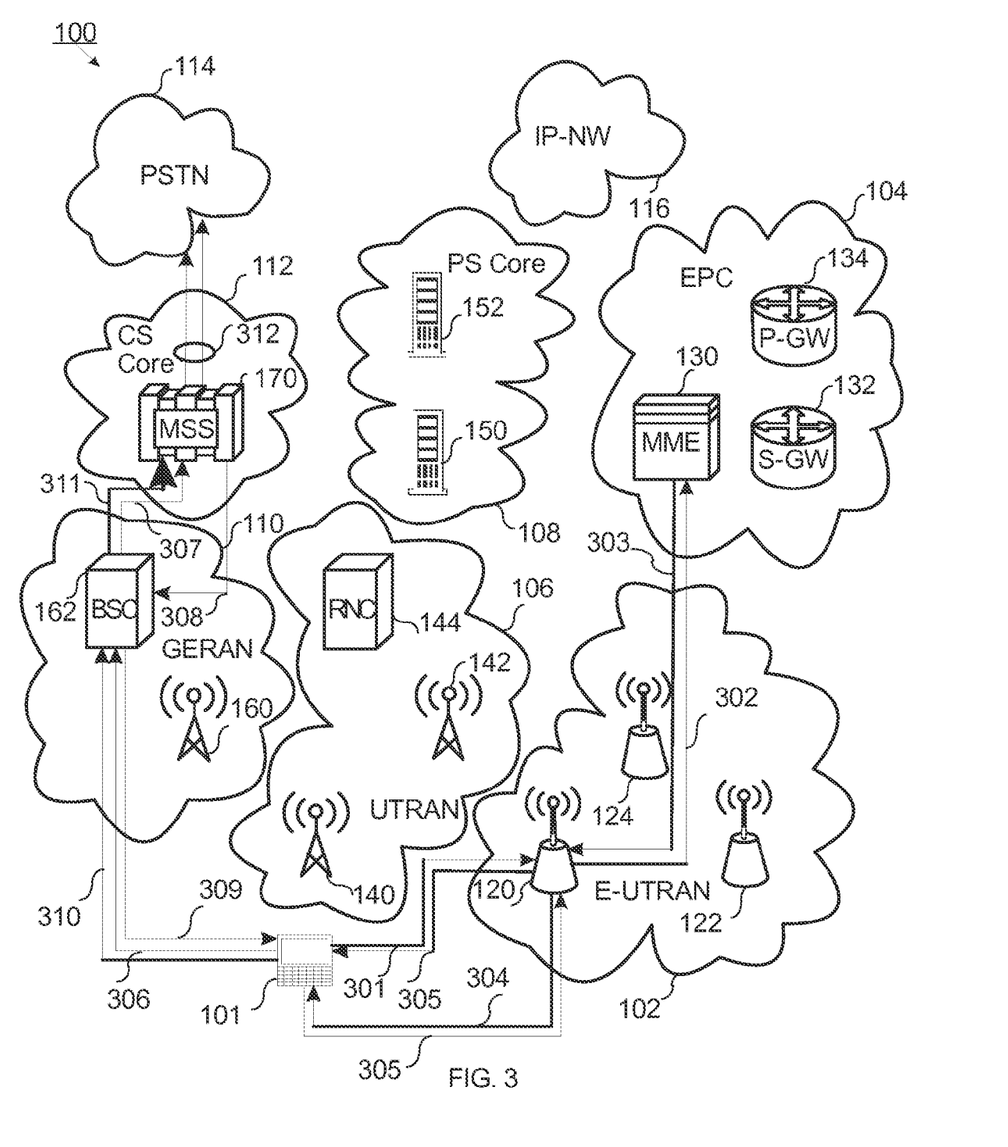
FIG. 3 is a block diagram illustrating a mobile originated call with fallback to a Circuit Switched (CS) Core Network (CN) in one embodiment of the invention.

FIG. 3 is a block diagram illustrating a mobile originated call with fallback to a Circuit Switched (CS) Core Network (CN) in one embodiment of the invention.

The starting point in FIG. 3 is that UE 101 is camping on a cell within a tracking area, to which eNodeB 120 belongs. As illustrated with arrow 301, UE 101 sends a service request message to eNodeB 120. ENodeB 120 send the service request messages onwards to MME 130, as illustrated with arrow 302. MME 130 sends an S1-AP message to eNodeB 120 as illustrated with arrow 303. The S1 AP message comprises a CS full-back indicator. The CS fallback indicator tells that the call to be established must be established via the circuits switch domain within either a 2G network or a 3G network. ENodeB 120 solicits measurement reports from UE 101, as illustrated with message 304. UE 101 performs the cell quality measurements and sends them in response to eNodeB 120, as illustrated with arrow 305. In order to avoid the sending of UE 101 to a wrong location area, eNodeB 120 checks if there are any suitable cells in the location area to which UE 101 has been registered by way of location update procedure. Should it be the case that UE 101 is sent to wrong MSC, the service request must be rejected and new location area update must be performed before a new circuit switched call may be established via another MSC. If there are no cells available in the location area registered, eNodeB 120 checks a list of location area identifiers obtained from MME 130 in message 303. ENodeB 120 checks if there are any cells with sufficient quality available in any of the location areas identified in the location area identifier list. If no cells are found in any of the location areas in the location area identifier list, eNodeB 120 selects any available cell. Upon having selected a cell, UE 101 sends a service request to BSC 162, as illustrated with arrow 306. The service request is transmitted via a base transceiver station (not shown). The service request is forwarded to MSC 170, as illustrated with arrow 307. By a service request message may also be meant a Radio Resource Control (RRC) connection request message. MSC 170 sends a response message to BSC 162, as illustrated with arrow 308. The response message may be a call proceeding message. The response message is forwarded from BSC 162 to UE 101, as illustrated with arrow 309. The bearer establishment from UE 101 to BSC 162 is illustrated with arrow 310. The bearer is further connected from BSC 162 to MSC 170, as illustrated with arrow 311. The lines representing signalling plane and user planes connections towards a PSTN 114 are encircled with oval 312. The circuit switched connection is bidirectional by nature.

In one embodiment of the invention, the numbering of arrows 301 to 311 indicates a possible temporal order of messages and actions in response thereto.

Figure 4:
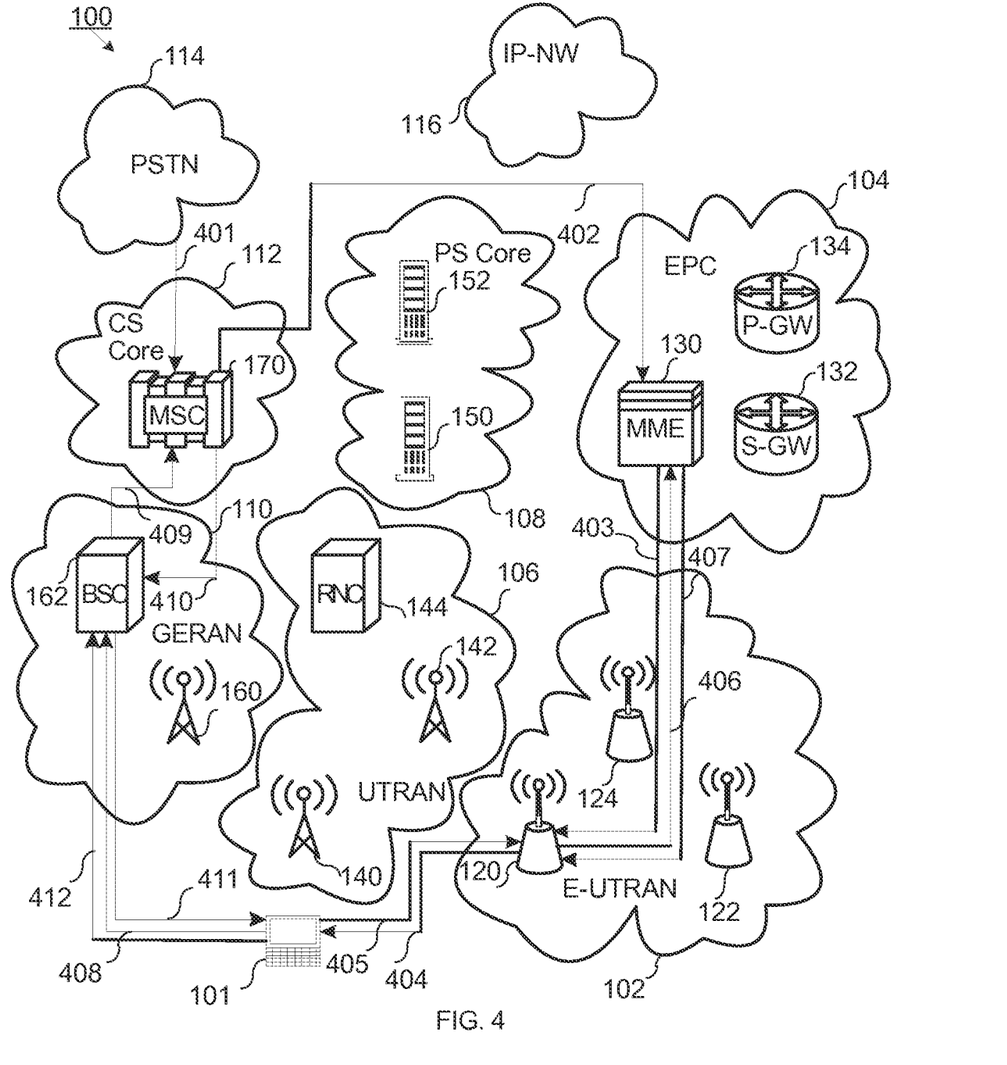
FIG. 4 is a block diagram illustrating a mobile terminated call with fallback to a Circuit Switched (CS) Core Network (CN) in one embodiment of the invention.

FIG. 4 is a block diagram illustrating a mobile terminated call with fallback to a Circuit Switched (CS) Core Network (CN) in one embodiment of the invention.

The starting point in FIG. 4 is that UE 101 is camping on a cell within eNodeB 120. UE 101 is also registered to a location area which has been mapped from the current tracking area of UE 101. As illustrated with arrow 401, MSC 170 receives an Initial Address Message (IAM) from PSTN 114. In response to the IAM, MSC 170 sends a paging message to MME 130, as illustrated with arrow 402. The paging message is sent further from MME 130 to eNodeB 120, as illustrated with arrow 403. The paging message is sent from eNodeB 120 to UE 101, as illustrated with arrow 404. In response to the paging UE 101 sends a service request message to eNodeB 120, as illustrated with arrow 405. The service request message is forwarded eNodeB 120 to MME 130, as illustrated with arrow 406. In response MME 130 sends an initial UE context setup message to eNodeB 120, as illustrated with arrow 407. UE 101 sends a paging response message to BSC 162 as illustrated with arrow 408. The paging response message is forwarded from BSC 162 to MSC 170, as illustrated with arrow 409. In response to successful channel assignment (not shown) MSC 170 sends a Call Control (CC) Setup message 410 to BSC 162. The CC Setup message is forwarded to UE 101, as illustrated with arrow 411. The allocation of a Traffic Channel (TCH) is illustrated with arrow 412. The traffic channel allocation may also be performed earlier.

In one embodiment of the invention, the numbering of arrows 401 to 412 indicates a possible temporal order of messages and actions in response thereto.

Figure 5:
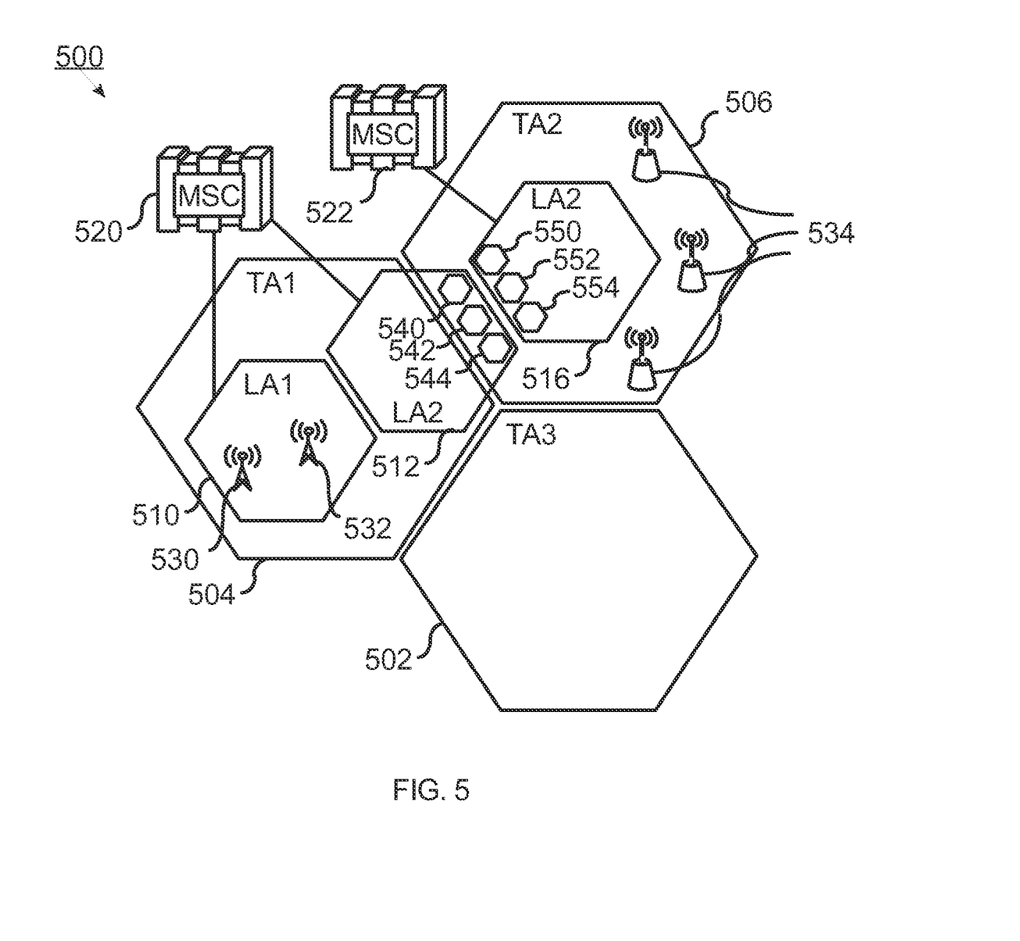
FIG. 5 is a block diagram illustrating overlapping Tracking Areas (TA) and Location Areas (LA) and the assignment of location areas to different Mobile Switching Centers (MSC) in one embodiment of the invention.

FIG. 5 is a block diagram illustrating overlapping Tracking Areas (TA) and Location Areas (LA) and the assignment of location areas to different Mobile Switching Centers (MSC) in one embodiment of the invention.

In FIG. 5 there is illustrated an Evolved Packed System (EPS) 500. EPS 500 comprises three tracking areas, namely a tracking area 502, a tracking area 504 and a tracking area 506. There are also three location areas, namely a location area 510, a location area 512 and a location area 516. There is a first MSC 520 and a second MSC 522. In location area 510 there are a nodeB 530 and a nodeB 532. In tracking area 506 there are illustrated three eNodeBs that are referred to with reference numeral 534. The number of eNodeBs and NodeBs is just for illustrative purposes and may vary in actual implementations. Location areas 510 and 512 are under the control of MSC 520. Location area 516 is under the control of MSC 522. Location area 512 is located in the boarder area between tracking areas 504 and 506. If UE has been registered to MSC 520, it must prefer cells in location area 512 instead of cells in location area 516 even if they provide marginally better radio quality.

In FIG. 5 there are shown cells 540-544 associated with location area 512 and cells 550-554 associated with location area 516. It is assumed a mobile node (not shown) is currently camping on a 4G cell (not shown) provided by tracking area 504 and it has previously performed a location update to a visitor location register in association with MSC 520. The location update has been performed in association with tracking area update for tracking area 504.

In one embodiment of the invention, in response to the tracking area update, the mobile node has obtained a list of allowed or prioritized location areas, which has comprised location areas 510 and 512. The list of location areas is used by the mobile node to avoid performing a handover from cell 544 to any of the cells 550-554 belonging to location area 516, while the mobile node is in the process of initiating a call or session via MSC 520.

In one embodiment of the invention, in response to the tracking area update, an eNodeB supporting the 4G cell has obtained an index to RAT/Frequency Selection Priority. The index provides information that prioritizes cells 540-544 over cells 550-554. The prioritization information is provided to the mobile node in the form of a prioritized cell or location area information, for example, a list. The priority information has the effect to minimize the probability of a handover from cell 544 to any of the cells 550-554 belonging to location area 516, while the mobile node is in the process of initiating a call or session via MSC 520.

In one embodiment of the invention, there may be defined number of radio parameter thresholds associated with different radio parameters that indicate how much a preferred cell from a preferred location area may differ from an actually better cell in order to allow the use of the cell from the preferred location area. For at least one radio parameter there is defined value margin that must not be exceeded in the preference of cells from the preferred location area over the cells that actually provide better radio quality.

The embodiments of the invention described in association with FIG. 5 may be used in any combination with each other. Several of the embodiments may be combined together to form a further embodiment of the invention.

Figure 6:
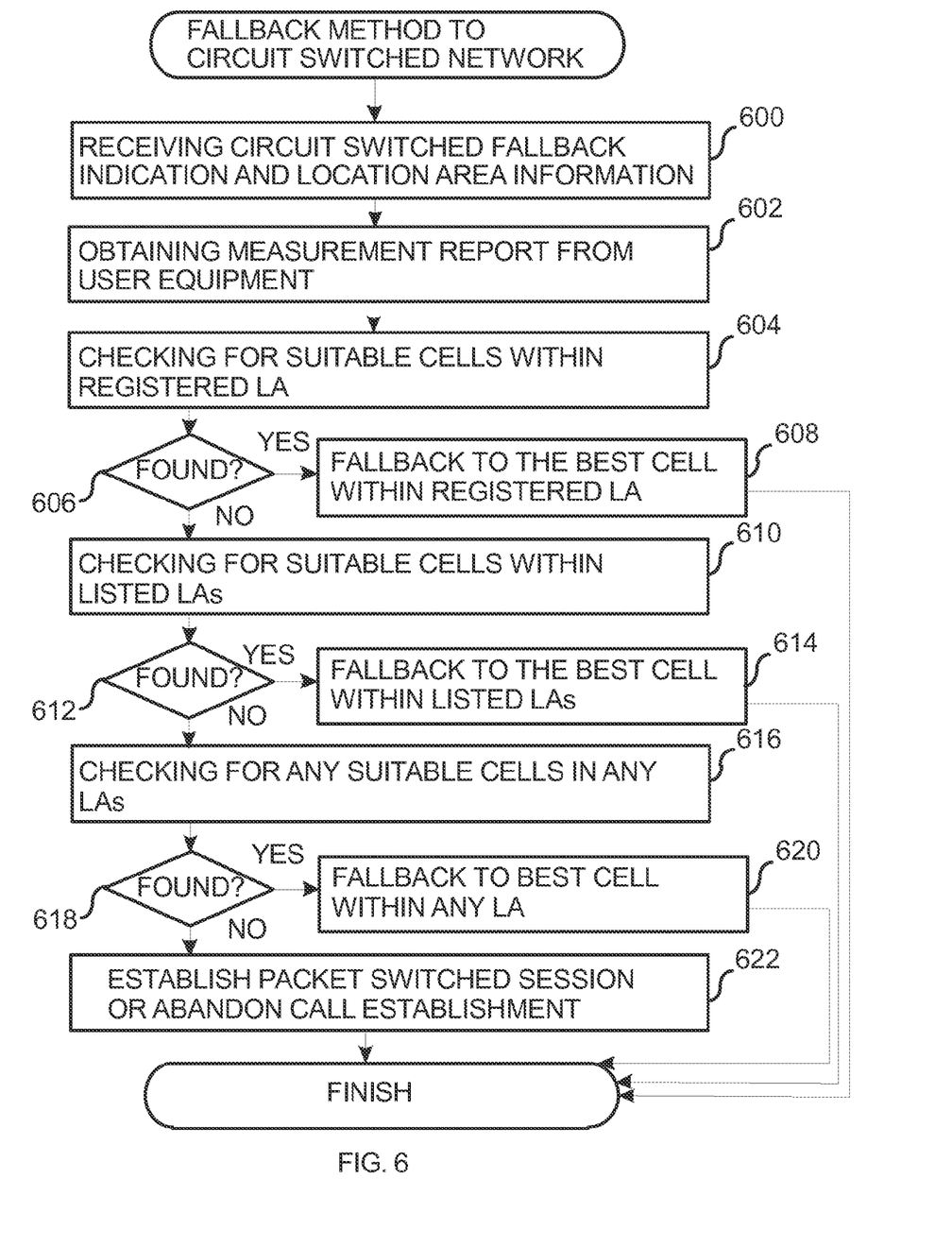
FIG. 6 is a flow chart illustrating a fallback method to a circuit switched network in one embodiment of the invention.

FIG. 6 is a flow chart illustrating a fallback method to a circuit switched network in one embodiment of the invention.

At step 600 circuit switched fall back indication and location area information are received to an eNodeB from an MME.

At step 602 eNodeB obtains measurement report from user equipment regarding neighboring cells currently received by the user equipment.

At step 604 the eNodeB checks for suitable cells within the location area to which the user equipment performed a location update.

At step 606 it is checked whether such cells were found. If at least one such cell was found the method continues at step 608, otherwise the method continues at step 610.

At step 608 a fallback to the best cell within the registered location area is performed by the UE under the command of eNodeB.

At step 610 eNodeB checks for suitable cells within location areas listed for the UE by the MME. At step 612 it checked if such cells where found. If the answer is yes, the method continues at step 614, otherwise the method continues at step 616.

At step 614 is performed fallback to the best cell within the listed location areas. The fallback is performed by the command of eNodeB to the UE.

At step 616 it is checked whether there are any suitable cells in any location area. At step 618 it is checked whether such cells were found. If the answer is yes, the method continues at step 620, otherwise the method continues at 622.

At step 620 a fallback to the best cell within any location area is performed by the UE, by the command of the eNodeB.

At step 622 a packet switched session is established or call establishment is abandoned. Typically a mobile originated call may be established via packed switched access, in case the establishment via circuit switched access is not possible.

In one embodiment of the invention, any of the method steps listed FIG. 6 may be performed by any base transceiver station or radio node instead of an eNodeB.

Figure 7:
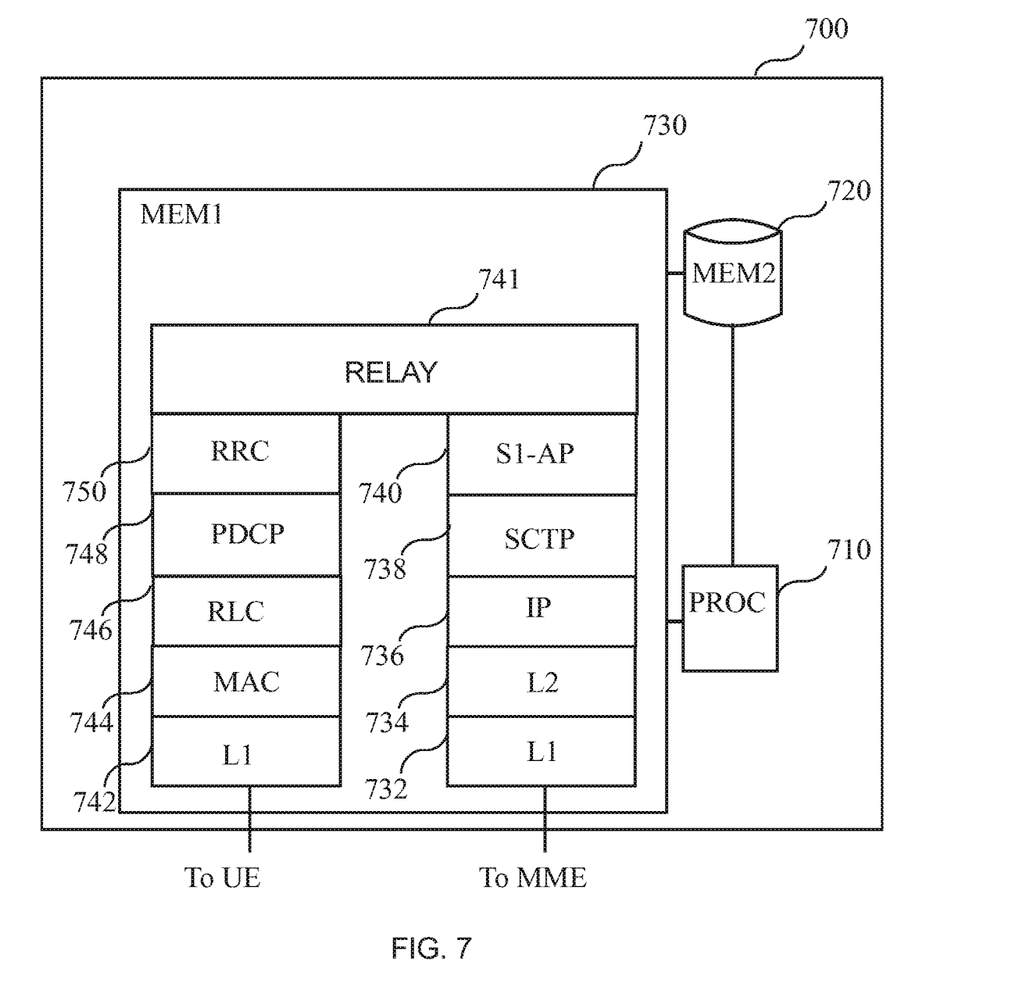
FIG. 7 is a block diagram illustrating a radio node in one embodiment of the invention.

FIG. 7 is a block diagram illustrating a base station node in one embodiment of the invention.

Base station node 700 comprises at least one processor such as a processor 710, a primary memory 730 and a secondary memory 720. Processor 710 may comprise multiple cores. Base station node also comprises at least one network interfaces such as, for example, an Ethernet card or an optical carrier interface. Primary memory 730 may be a Random Access Memory (RAM). Secondary memory 720 is a non-volatile memory such as, for example, a magnetic or optical disk.

In memory 730 there is stored software relating to functional entities 732 to 750. Regarding to interface to a Mobility Management Entity (MME) there are functional entities 732-740. Regarding the interface to UE, there are functional entities 742-750. There is also a relay functional entity 741. Functional entity 732 corresponds to OSI layer 1. Functional entity 734 corresponds to OSI layer 2. Functional entity 736 corresponds to IP Protocol layer. Functional entity 738 corresponds to stream control transmission protocol. Functional entity 740 corresponds to S1 interface application protocol. Functional entity 742 corresponds to OSI layer 1. Functional entity 744 corresponds to the media access control sublayer. Functional entity 746 corresponds to the radio link control sublayer. Functional entity 748 corresponds to the Packet Data Convergence Protocol (PDCP). Functional entity 750 corresponds to radio resource control protocol. Functional entity 750 corresponds to the S1 interface application protocol. In one embodiment of the invention, radio resource control functional entity 750 is configured to provide to a mobile node cell selection related information, such information for the preference of cell belonging to a registered location area and/or the preference of cells in listed location areas. In one embodiment of the invention radio resource control functional entity is configured to perform at least one of the method steps explained in association with FIG. 6. In one embodiment of the invention, at least one of the method steps associated with FIG. 6 may be performed either in the relay functional entity or in the radio resource control functional entity.

When the at least one processor 710 executes functional entities associated with the invention, memory 730 comprises entities such as, any of the functional entities 732-750. The functional entities within apparatus 700 illustrated in FIG. 7 may be implemented in a variety of ways. They may be implemented as processes executed under the native operating system of the network node. The entities may be implemented as separate processes or threads or so that a number of different entities are implemented by means of one process or thread. A process or a thread may be the instance of a program block comprising a number of routines, that is, for example, procedures and functions. The functional entities may be implemented as separate computer programs or as a single computer program comprising several routines or functions implementing the entities. The program blocks are stored on at least one computer readable medium such as, for example, a memory circuit, memory card, magnetic or optic disk. Some functional entities may be implemented as program modules linked to another functional entity. The functional entities in FIG. 1 may also be stored in separate memories and executed by separate processors, which communicate, for example, via a message bus or an internal network within the network node. An example of such a message bus is the Peripheral Component Interconnect (PCI) bus.

The exemplary embodiments of the invention can be included within any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (for instance, voice, modem, and the like), wireless communications media, one or more wireless communications networks, cellular communications networks, 3 G communications networks, 4 G communications networks Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices.

The exemplary embodiments can store information relating to various processes described herein. This information can be stored in one or more memories, such as a hard disk, optical disk, magnetooptical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of application-specific integrated circuits or by interconnecting an appropriate network of conventional component circuits, as will be appreciated by those skilled in the electrical art(s).

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method, comprising:
    registering an evolved packet system tracking area of a mobile node to a mobility management node by a base station node;
    determining a location area of a fallback system based on a location of the mobile node;
    registering the location area of the mobile node to a visitor location register of the fallback system, the fallback system comprising at least one of the Global System of Mobile Communications, the Universal Mobile Telecommunication System and the Code Division Multiple Access 2000;
    receiving, by the base station node, a request to perform user plane bearer establishment through the fallback system;
    obtaining, by the base station node, radio measurements associated with at least two candidate cells from the mobile node;
    checking, by the base station node, the at least two candidate cells for at least one cell associated with the location area registered to the visitor location register;
    selecting, by the base station node, a cell among the at least one cell associated with the location area registered to the visitor location register, in case the cell associated with the location area registered to the visitor location register provides at least an absolute minimum value for at least one respective radio parameter or the cell associated with the location area registered to the visitor location register does not have at least one radio parameter value exceeding at least one respective radio parameter threshold indicating how much worse the at least one radio parameter value may be in the cell associated with the location area registered to the visitor location register to select the cell associated with the location area registered to the visitor location register instead of a cell providing the best at least one respective radio parameter value;
    indicating the selected cell to the mobile node; and
    providing at least one of a handover request, a cell change order and a request for a redirection to the mobile node.

2. The method according to claim 1, the method further comprising:
    establishing a user plane connection via the selected cell to a network element associated with the visitor location register.

3. The method according to claim 2, wherein the user plane connection comprises a circuit switched call and the network element is at least one of a mobile switching centre, mobile switching centre server and a 1xRTT MSC.

4. The method according to claim 1, the method further comprising:
    obtaining the location of the mobile node as an evolved packet system tracking area; and
    mapping the evolved packet system tracking area to the location area using a mapping table.

5. The method according to claim 1, the method further comprising:
    receiving from the mobility management node, by a radio resource control entity in the base station node, an index to a locally defined configuration, the locally defined configuration pertaining to radio access technology and frequency selection priority; and obtaining, by the radio resource control entity, prioritization information to prioritize at least one cell that belongs to the location area registered to the visitor location register over other cells in the fallback system.

6. The method according to claim 5, wherein the radio resource control entity provides the prioritization information obtained to the mobile node.

7. The method according to claim 6, wherein the prioritization information minimizes the probability of handover, cell change order or redirect to a cell not belonging to the location area registered to the visitor location register of the network element via which the user plane connection is being established.

8. The method according to claim 1, the method further comprising:
obtaining a handover restriction list indicating the location area registered to the visitor location register as the only allowed location area of the fallback system for the mobile node.

9. The method according to claim 8, the method further comprising:
detecting an incoming communication for the mobile node in the fallback system;
checking at least one transmission from at least one neighboring cell in the mobile node;
checking the restriction list by the mobile node; and
skipping a location update in response to a finding at least one neighboring cell in the restriction list.

10. A system, comprising:
a mobile node configured to perform radio measurements, to send a registration for an evolved packet system tracking area of the mobile node to a base station node and to receive at least one of a handover request, a cell change order and a request for a redirection;
a mobility management node configured to receive a registration of the evolved packet system tracking area and to map the evolved packet system tracking area of the mobile node to a location area;
a visitor location register configured to receive a registration of the location area of a fallback system, the fallback system comprising at least one of the Global System of Mobile Communications, the Universal Mobile Telecommunication System and the CDMA2000; and
the base station node configured to register the evolved packet system tracking area of the mobile node to the mobility management node, to receive a request to perform user plane bearer establishment through the fallback system, to obtaining radio measurements associated with at least two candidate cells from the mobile node, to check the at least two candidate cells for at least one cell associated with the location area from the mobility management node, to select a cell among the at least one cell associated with the location area from the mobility management node, in case the cell associated with the location area registered to the visitor location register provides at least an absolute minimum value for at least one respective radio parameter or the cell associated with the location area registered to the visitor location register does not have at least one radio parameter value exceeding at least one respective radio parameter threshold indicating how much worse the at least one radio parameter value may be in the cell associated with the location area registered to the visitor location register to select the cell associated with the location area registered to the visitor location register instead of a cell providing the best at least one respective radio parameter value, to indicate the selected cell to the mobile node and to provide at least one of a handover request, a cell change order and a request for a redirection to the mobile node.

11. An apparatus, comprising:
a memory; and
at least one processor configured to register an evolved packet system tracking area of a mobile node to a mobility management node, to determine a location area of a fallback system based on a location of the mobile node, to register the location area of the mobile node to a visitor location register of the fallback system, the fallback system comprising at least one of the Global System of Mobile Communications, the Universal Mobile Telecommunication System and the Code Division Multiple Access 2000, to receive a request to perform user plane bearer establishment through the fallback system, to obtain radio measurements associated with at least two candidate cells from the mobile node, to check the at least two candidate cells for at least one cell associated with the location area registered to the visitor location register, to select a cell among the at least one cell associated with the location area registered to the visitor location register, in case the cell associated with the location area registered to the visitor location register provides at least an absolute minimum value for at least one respective radio parameter or the cell associated with the location area registered to the visitor location register does not have at least one radio parameter value exceeding at least one respective radio parameter threshold indicating how much worse the at least one radio parameter value may be in the cell associated with the location area registered to the visitor location register to select the cell associated with the location area registered to the visitor location register instead of a cell providing the best at least one respective radio parameter value, to indicate the selected cell to the mobile node, and to provide at least one of a handover request, a cell change order and a request for a redirection to the mobile node.

12. An apparatus, comprising:
means for registering an evolved packet system tracking area of a mobile node to a mobility management node;
means for determining a location area of a fallback system based on a location of the mobile node;
means for registering the location area of the mobile node to a visitor location register of the fallback system, the fallback system comprising at least one of the Global System of Mobile Communications, the Universal Mobile Telecommunication System and the Code Division Multiple Access 2000;
means for receiving a request to perform user plane bearer establishment through the fallback system;
means for obtaining radio measurements associated with at least two candidate cells from the mobile node;
means for checking the at least two candidate cells for at least one cell associated with the location area registered to the visitor location register;
means for selecting a cell among the at least one cell associated with the location area registered to the visitor location register, in case the cell associated with the location area registered to the visitor location register provides at least an absolute minimum value for at least one respective radio parameter or the cell associated with the location area registered to the visitor location register does not have at least one radio parameter value exceeding at least one respective radio parameter threshold indicating how much worse the at least one radio parameter value may be in the cell associated with the location area registered to the visitor location register to select the cell associated with the location area registered to the visitor location register instead of a cell providing the best at least one respective radio parameter value;

means for indicating the selected cell to the mobile node; and means for providing at least one of a handover request, a cell change order and a request for a redirection to the mobile node.

13. A non-transitory computer storage readable medium comprising a computer program to perform the following steps when executed on a data-processing system:

registering an evolved packet system tracking area of a mobile node to a mobility management node;

determining a location area of a fallback system based on a location of the mobile node;

registering the location area of the mobile node to a visitor location register of the fallback system, the fallback system comprising at least one of the Global System of Mobile Communications, the Universal Mobile Telecommunication System and the Code Division Multiple Access 2000;

receiving a request to perform user plane bearer establishment through the fallback system;

obtaining radio measurements associated with at least two candidate cells from the mobile node;

checking the at least two candidate cells for at least one cell associated with the location area registered to the visitor location register;

selecting a cell among the at least one cell registered to the visitor location register, in case the cell associated with the location area registered to the visitor location register provides at least an absolute minimum value for at least one respective radio parameter or the cell associated with the location area registered to the visitor location register does not have at least one radio parameter value exceeding at least one respective radio parameter threshold indicating how much worse the at least one radio parameter value may be in the cell associated with the location area registered to the visitor location register to select the cell associated with the location area registered to the visitor location register instead of a cell providing the best at least one respective radio parameter value;

indicating the selected cell to the mobile node; and providing at least one of a handover request, a cell change order and a request for a redirection to the mobile node.

14. The non-transitory computer storage readable medium according to claim 13, wherein said non-transitory computer storage readable medium is a removable memory card, a holographic memory, a magnetic disk or an optical disk.

15. The system according to claim 10, wherein a user plane connection is established via the selected cell to a network element associated with the visitor location register.

16. The apparatus according to claim 11, wherein a user plane connection is established via the selected cell to a network element associated with the visitor location register.

17. The apparatus according to claim 12, wherein a user plane connection is established via the selected cell to a network element associated with the visitor location register.

18. The storage medium according to claim 13, wherein a user plane connection is established via the selected cell to a network element associated with the visitor location register.

* * * * *